(12) United States Patent
Narippatta et al.

(10) Patent No.: US 10,103,869 B2
(45) Date of Patent: Oct. 16, 2018

(54) SYSTEMS, APPARATUS, AND METHODS FOR PACKETIZED CLOCKS

(71) Applicant: Infinera Corporation, Annapolis Junction, MD (US)

(72) Inventors: Vinod Narippatta, Bangalore (IN); Mohammed Asad Rizvi, Bengaluru (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/249,343

(22) Filed: Aug. 26, 2016

(65) Prior Publication Data
US 2017/0302434 A1    Oct. 19, 2017

Related U.S. Application Data

(60) Provisional application No. 62/323,275, filed on Apr. 15, 2016.

(51) Int. Cl.
*H04Q 11/00*    (2006.01)
*H04L 7/00*    (2006.01)
*H04L 7/033*    (2006.01)
*H04J 14/02*    (2006.01)
*H04L 12/933*    (2013.01)

(52) U.S. Cl.
CPC .......... *H04L 7/0075* (2013.01); *H04J 14/021* (2013.01); *H04L 7/0331* (2013.01); *H04Q 11/0003* (2013.01); *H04L 49/15* (2013.01)

(58) Field of Classification Search
CPC ....... H04L 47/18; H04L 47/115; H04L 49/90; H04Q 11/0003; H04J 14/021
See application file for complete search history.

(56) References Cited

U.S. PATENT DOCUMENTS

| | | | | |
|---|---|---|---|---|
| 5,768,328 | A * | 6/1998 | Nielsen | H04J 3/073 370/505 |
| 2008/0072098 | A1 * | 3/2008 | Hunsaker | H04L 12/40 713/501 |
| 2012/0105680 | A1 * | 5/2012 | Park | H04N 5/335 348/231.99 |
| 2013/0129114 | A1 * | 5/2013 | Lesso | H03L 7/08 381/98 |
| 2016/0139807 | A1 * | 5/2016 | Lesartre | G11C 5/04 711/154 |

\* cited by examiner

*Primary Examiner* — Dzung Tran
(74) *Attorney, Agent, or Firm* — Tyler S. Brown; David L. Soltz

(57) ABSTRACT

Systems, apparatus, and methods for packetized clocks may include a packet interface to carry the rate of a client to a sigma-delta modulator that generates a clock at the required rate inside the chip itself there by removing the need for off-chip analog PLLs. The packetized clock may include a packet interface that receives a flow credit packet that includes a plurality of flow credit counts, one flow credit count for each data flow, and forwards a flow credit count for each data flow to one of a plurality of clock generators to generate a new clock signal for each data flow.

12 Claims, 8 Drawing Sheets

SYSTEMS, APPARATUS, AND METHODS FOR PACKETIZED CLOCKS

CLAIM OF PRIORITY UNDER 35 U.S.C. § 120

The present Application for Patent claims priority to provisional U.S. Patent Application No. 62/323,275, entitled "Systems, Apparatus, and Methods for Packetized Clocks," filed Apr. 15, 2016, assigned to the assignee hereof, and expressly incorporated herein by reference in its entirety.

FIELD OF DISCLOSURE

This disclosure relates generally to packet optical communication networks and more specifically, but not exclusively, to packetized clocks in packet optical communication networks.

BACKGROUND

Packet optical communication networks typically involve a number of different clients with each client potentially using a different transmission rate for their data traffic. Thus, the network must accommodate the use of different rates by the multiple clients. To do so, the network uses multiple operating clocks to manage the data traffic. The multiple operating clocks are generated using dedicated analog phase locked loop (PLL) circuits in a semiconductor integrated circuit (chip) separate from the memory and logic chips used in the network devices for managing the data traffic and the device itself. However, the use of a separate clock chip increases the cost of the network device.

The network devices also include field-replaceable units (FRU), such as the separate clock chip. The FRU is a circuit board, part or assembly that can be quickly and easily removed from the network device and replaced by the user or a technician without having to send the entire device to a repair facility. FRUs allow a technician lacking in-depth product knowledge to isolate faults and replace faulty components. Unfortunately, the use of clocks that are PLLs on a FRU increases the amount of space required on the printed circuit boards of the network device. The use of a separate clock chip, therefore, presents a scaling issue with respect to FRU real estate on high rate devices (e.g. terabit rate clock FRUs).

Accordingly, there is a need for systems, apparatus, and methods that solves this problem by managing the rates of these multiple clients in the digital domain and thereby restricting the need for separate clock chips such as analog PLLs while allowing the network device to handle multiple clients with different data rates on the main chip including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, an apparatus comprises: an interface configured to input a first packet that includes a first plurality of flow credit counts and output the first plurality of flow credit counts, each of the first plurality of flow credit counts indicates a data rate for a respective one of a plurality of data flows; and a plurality of clock generators coupled to the interface, each of the plurality of clock generators configured to input a respective one of the first plurality of flow credit counts and output a clock signal that corresponds to the data rate of the respective one of the plurality of data flows.

In another aspect, a method comprises: receiving, at an interface, a first packet that includes a first plurality of flow credit counts, each of the first plurality of flow credit counts indicates a data rate for a respective one of a plurality of data flows; and outputting, by the interface, each of the first plurality of flow credit counts to a respective one of a plurality of clock generators coupled to the interface, each of the plurality of clock generators configured to input a respective one of the first plurality of flow credit counts and output a clock signal that corresponds to the data rate of the respective one of the plurality of data flows.

In still another aspect, a non-transient computer readable medium containing program instructions for causing a processor to perform a process comprising: receiving, at an interface, a first packet that includes a first plurality of flow credit counts, each of the first plurality of flow credit counts indicates a data rate for a respective one of a plurality of data flows; and outputting, by the interface, each of the first plurality of flow credit counts to a respective one of a plurality of clock generators coupled to the interface, each of the plurality of clock generators configured to input a respective one of the first plurality of flow credit counts and output a clock signal that corresponds to the data rate of the respective one of the plurality of data flows.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
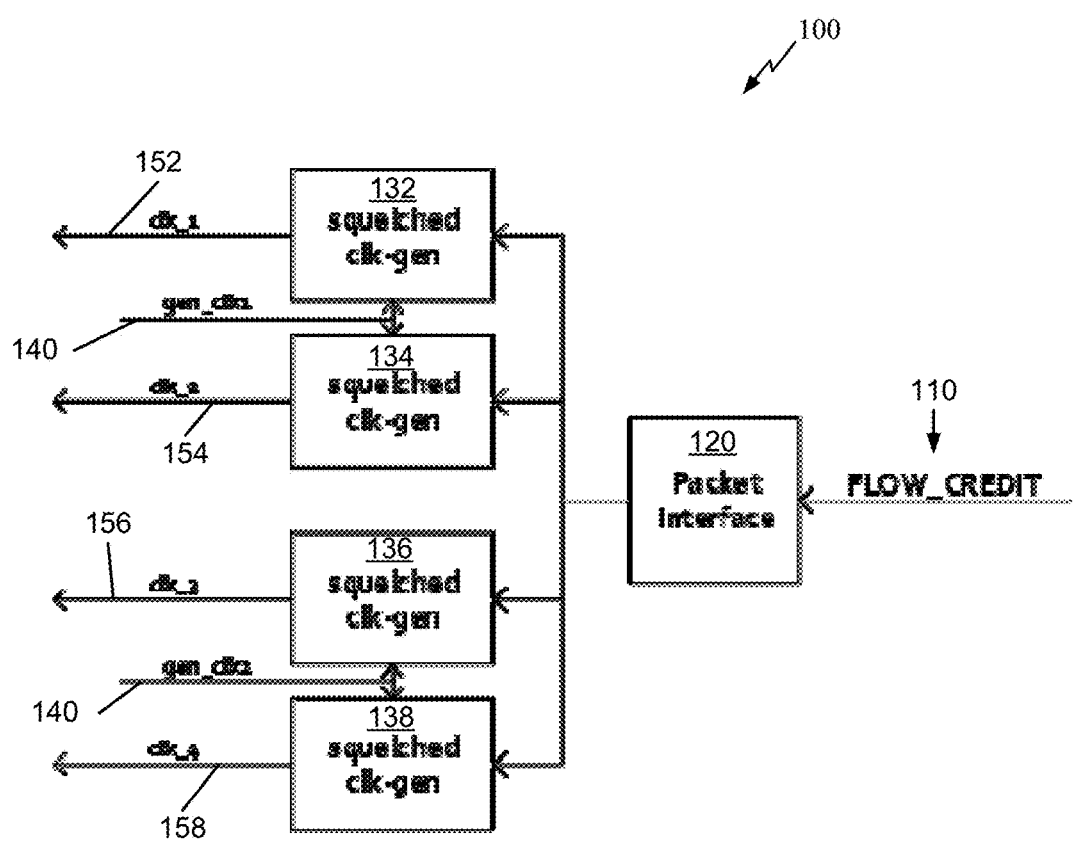
FIG. 1 illustrates an exemplary packetized clock in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. In some examples, the systems, methods, and apparatus herein include a packet interface that receives a flow credit packet that includes a plurality of flow credit counts, one flow credit count for each data flow, and forwards a flow credit count for each data flow to one of a plurality of clock generators to generate a new clock signal for each data flow. The flow credit count is the number of credits the receiver has received. The flow credit count may be used by a sigma delta modulator (See FIGS. 3 and 4 below), for example, to generate an appropriate clock signal in accordance with Annex D of ITU-T G.709.

FIG. 1 illustrates an exemplary packetized clock 100 in accordance with some examples of the disclosure. As shown in FIG. 1, the packetized clock 100 may include a plurality of flow credit packet 110 inputs to a packet interface 120, a plurality of clock generators coupled to the packet interface 120, the plurality of clock generators including a first clock generator 132, a second clock generator 134, a third clock generator 136, and a fourth clock generator 138. Each of the clock generators 132-138 is coupled to a system clock 140 and has a respective clock output—a first clock output 152, a second clock output 154, a third clock output 156, and a fourth clock output 158. The flow credit packets 110 are received by the packet interface 120, which extracts the credit count 210-$x$ received on a per client (or flow) basis. The flow credit packets 110 may be generated by a component of a node 12 (See FIGS. 5A-5D), such as a controller 10 (See FIGS. 5A-5D) for example, or generated by an outside device. The packet interface 120 forwards each of the flow credit counts 210-$x$ to the plurality of clock generators (one flow credit count per clock generator). The clock generators 132-138 use the flow credit count 210-$x$ and a sigma-delta modulator 400 (e.g. a conventional analog to digital converter) to generate the clock outputs 152-158. While the packetized clock 100 shows four clock generators 132-138, it should be understood that more or less clock generators may be used.

Figure 2:
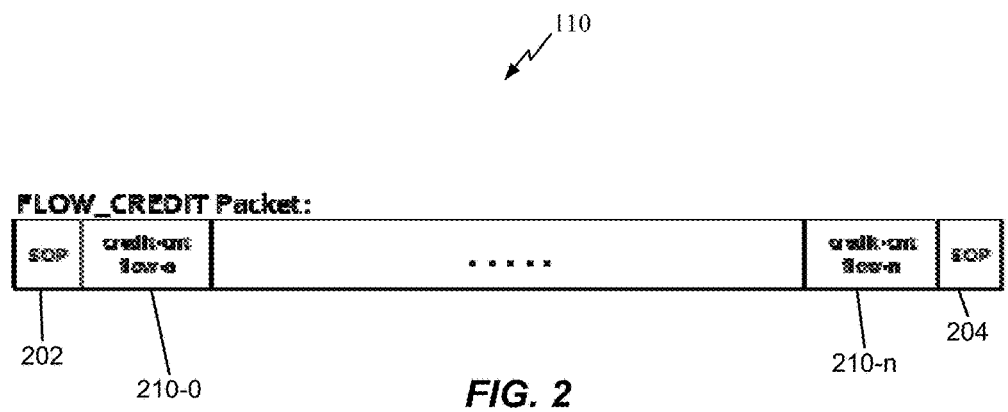
FIG. 2 illustrates a flow credit packet in accordance with some examples of the disclosure.

FIG. 2 illustrates a flow credit packet 110 in accordance with some examples of the disclosure. As shown in FIG. 2, a flow credit packet 110 may include a start of packet (SOP) section 202 that indicates the start of the packet 110, followed by a plurality (n) of flow credit counts sections 210-0 to 210-$n$, and an end of packet section 204 that indicates the end of the packet 110. Each of the flow credit count sections 210-0 to 210-$n$ indicates a per-flow data rate as a credit count for a separate data flow (e.g. serial data stream). The flow credit counts represent the number of bits that are required to be sent during a time period T for that particular data flow. The flow credit packets 110 may be received periodically every T-seconds (e.g. every 10 seconds). It should be understood that the flow credit packet 110 may contain additional sections that contain additional information.

Figure 3:
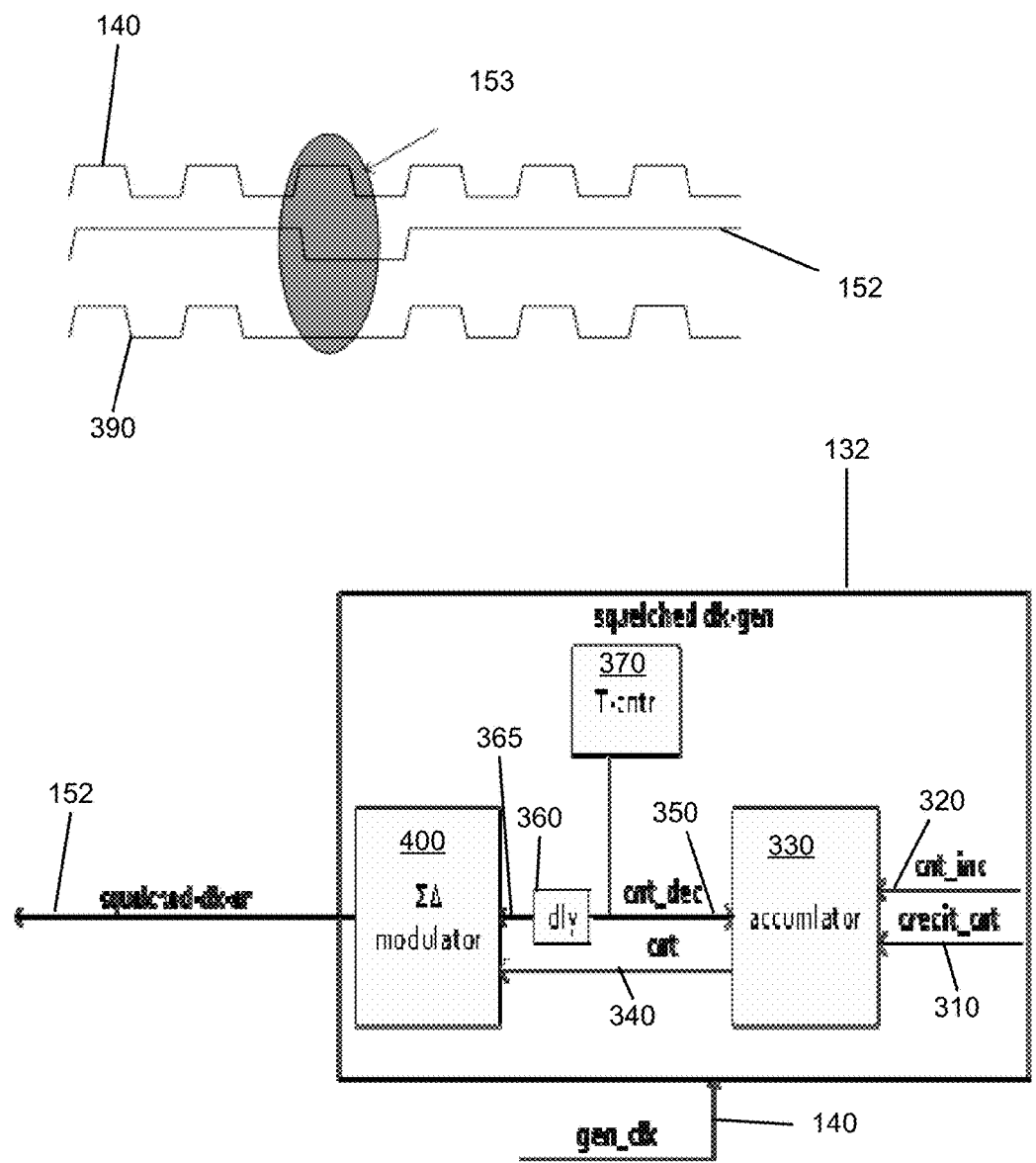
FIG. 3 illustrates an exemplary clock generator in accordance with some examples of the disclosure.

FIG. 3 illustrates an exemplary clock generator 132 in accordance with some examples of the disclosure. The clock generator 132 uses a squelched clock enable signal 152 to generate a lower clock (e.g. squelched clock 390) by removing clock-pulses from a higher clock (e.g. system clock 140). The squelched clock enable signal 152 may be generated in a conventional manner by a well-known sigma-delta modulator 400 by distributing Cm (i.e. input 401) valid clocks over Pserv clocks (i.e. output 406). Since the sigma-delta modulator operation is well known and a more detailed explanation of its operation may be found in Annex D of ITU-T G.709 standard (ITU-T is expressly incorporated herein by reference in its entirety), only a brief overview is included below.

As shown in FIG. 3, a clock generator 132 may input a credit count 310 (e.g. credit count section 210-0) and a count increment 320 into an accumulator 330. The credit increment 320 (cnt_int) is the indication from the packet interface 120 to add credits received via the credit packet 110 into the accumulator 330. The time counter 370 outputs count decrement indication 350 to both a delay element 360 and accumulator 330. The count decrement 350 (cnt_dec) is generated when the time counter 370 (T-cntr) rolls over (i.e. is reset after it reaches the Pserv value). This is used to pull out a credit count 310 from the accumulator 330. In response, the accumulator 330 outputs a count 340 to a sigma delta modulator 400, the delay-element 360 (e.g. a flip-flop, latches, memories, etc.) delays the count decrement indication 350, and generates delay signal 365 to the sigma delta modulator 400. The sigma delta modulator 400 inputs the count 340 and a delay signal 365 from the delay element 360 to generate the squelched clock enable signal 152. As shown in FIG. 3, the credit counts 310 received are first accumulated in the accumulator 330 and then sent as a count 340 to the sigma-delta modulator 400 every T time period. The count decrement 350 is updated every time period T and the time period T may be used as the Pserv for the sigma-delta modulator 400. This may guarantee the Cm<=Pserv requirement of the sigma-delta modulator 400. As shown in FIG. 3, the squelched clock enable 152 would be generated by the sigma-delta modulator 400 by distributing Cm valid clocks over Pserver clocks according to Annex D of G. 709. The timing diagram of FIG. 3 shows the input source clock 140, the squelch-enable signal 152, and the generated squelched clock 390. The shaded area 153 in the timing diagram is indicating the clock removed by the squelching of the input clock 140 by "AND"ing with the squelched clock enable signal 152. The sigma-delta modulator 400 only allows for Cm clock edges to be present in each Pserv clock and the Cm is provided by the credit count 310 value, and so the different values of credit count 310 yields difference frequencies by squelching multiple clock edges thereby controlling the output frequencies of the squelched clock 390.

Figure 4:
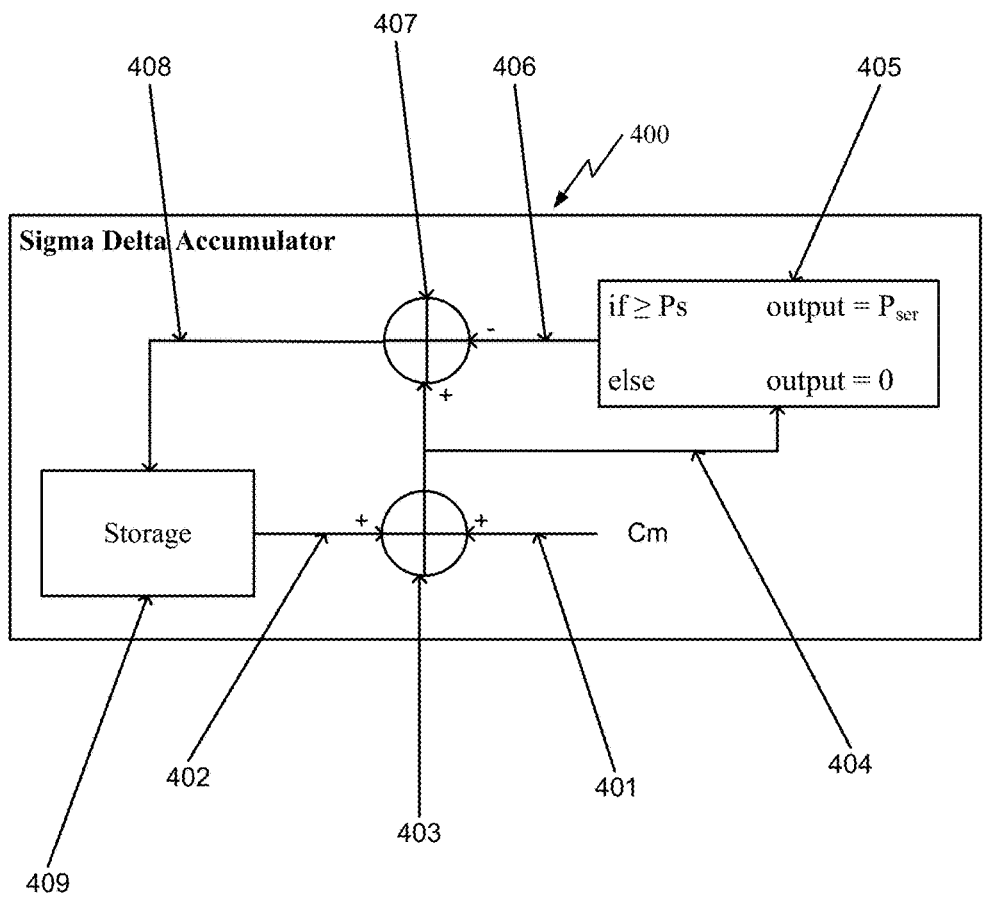
FIG. 4 illustrates an exemplary sigma delta modulator in accordance with some examples of the disclosure.

FIG. 4 illustrates an exemplary sigma delta modulator 400 in accordance with some examples of the disclosure. The sigma-delta modulator 400 allows the even distribution of Cm (i.e. input 401) over Pserv (i.e. output 406) as required and described in Annex D of G.709. Without an even distribution there will be costs to the data path, such as a higher memory requirement. Annex D of G.709 describes these issues in more detail with examples. The sigma-delta modulator 400 shown generalizes this distribution for arbitrary Cm and Pserv (such that Pserv>=Cm). As shown in FIG. 4, the variable Ps is the Pserv (time period T) of the sigma-delta modulator 400. Input 401 is the input Cm indicated as 340 in FIG. 3. Accumulated count 402 is the accumulated count from the last processing cycle. Adder 403 is the adder that adds 401 and 402 and outputs 404. Comparator 405 is the Pser comparator that outputs 406 as Pser if the result of addition is greater than or equal to Pser or 0 otherwise. Subtractor 407 subtracts 406 from 404 to generate 408. Storage 409 is storage to store 408 until the next processing cycle.

Figure 5A:
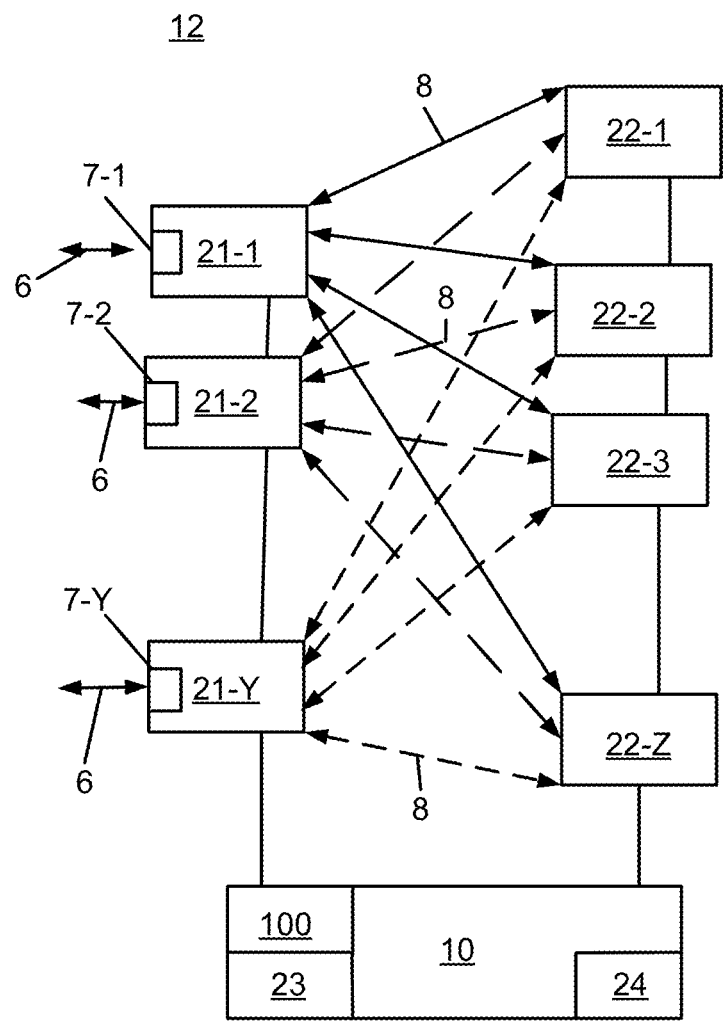
FIG. 5A illustrates an exemplary node of a network in accordance with some examples of the disclosure. in accordance with some examples of the disclosure.

The examples herein may be used in conjunction with a node 12 (including the packetized clock 100) described in FIGS. 5A-5D. FIG. 5A is a diagram of exemplary components of node 12. As shown in FIG. 5A, node 12 may include a packetized clock 100, a controller 10 configurable to control the operation of the node 12 including connection admission (e.g. a software defined networking controller capable of connection admission control—enabling a new connection in a network), line cards or modules 21-1, 21-2, . . . , 21-Y (referred to collectively as "line modules 21," and individually as "line module 21") (where Y>=1) connected to switching planes 22-1, 22-2, to 22-Z (referred to collectively as "switching planes 22," and individually as "switching plane 22") (where Z>=1). Controller 10 may be an application, such as in a software defined network (SDN), that manages flow control to enable intelligent networking. Controller 10 may be based on protocols, such as OpenFlow, that allow servers to tell switches (e.g. node 12) where to send packets (e.g. packet 417). The controller 10 may logically lie between network devices (e.g. node 12) at one end and applications at the other end. Controller 10 may be configured such that communications between applications and devices (e.g. node 12) have to go through the controller 10. The controller 10 may include a logic circuit 23 and a memory 24 configured to uses protocols such as OpenFlow to configure network devices and choose the optimal network path (e.g. first path 460 or second path 470) for application traffic. In effect, the controller 10 may be configured to serve as an operating system for the network 16. By taking the control plane off the network hardware and running it as software instead, the controller 10 may facilitate automated network management and makes it easier to integrate and administer business applications. OpenFlow is a programmable network protocol designed to manage and direct traffic among routers and switches from various vendors. It separates the programming of routers and switches from underlying hardware. OpenFlow may consist of three parts: flow tables installed on switches (e.g. node 12), a controller 10 and a proprietary OpenFlow protocol for the controller 10 to talk securely with switches 12. Flow tables are set up on switches 12. Controller 10 talks to the switches 12 via the OpenFlow protocol and impose policies on flows. The controller 10 could set up paths through the network optimized for specific characteristics, such as speed, fewest number of hops or reduced latency.

While FIG. 5A shows a particular number and arrangement of components, node 12 may include additional, fewer, different, or differently arranged components than those illustrated in FIG. 5A. Also, it may be possible for one of the components of node 12 to perform a function that is described as being performed by another one of the components. Node 12 may be configured as a TDM capable optical switch, a router, a reconfigurable optical add/drop multiplexer (ROADM) such as Infinera Corporation's (Sunnyvale, Calif.) commercially available DTN-X packet optical transport capable switch, Infinera Corporation's commercially available EMXP packet-optical transport switch, or similar device configurable to provide Carrier Ethernet services. Node 12 may also be referred to as a device, such as a first device, a second device etc. The line module 21 may be configured as a packet switching module, such as Infinera's PXM module, that supports switching of VLAN tagged packets into ODUFlex or ODU2e circuits. This allows the node 12 to dynamically switch IP/MPLS router traffic over an OTN network using the VLAN label ID to the destination device. This may enable packet switching functionality over an OTN network with maximum network efficiency and scalability by combining the benefits of device bypass with standardized ODU0 level multi-service grooming and switching.

Each of the Line modules 21-1 to 21-Y may include hardware components such as one or more ports 7-1, 7-2, . . . , 7-Y, or a combination of hardware and software components, that may provide network interface operations. Each line module 21-1 to 21-Y may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between each line module 21-1 to 21-Y. In one implementation, switching plane 22 may provide fully non-blocking transfer of data. As to be explained below, switching plane 22 may be programmed to transfer data from a particular input port 6 to a particular output port 6.

As shown in FIG. 5A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 5B:
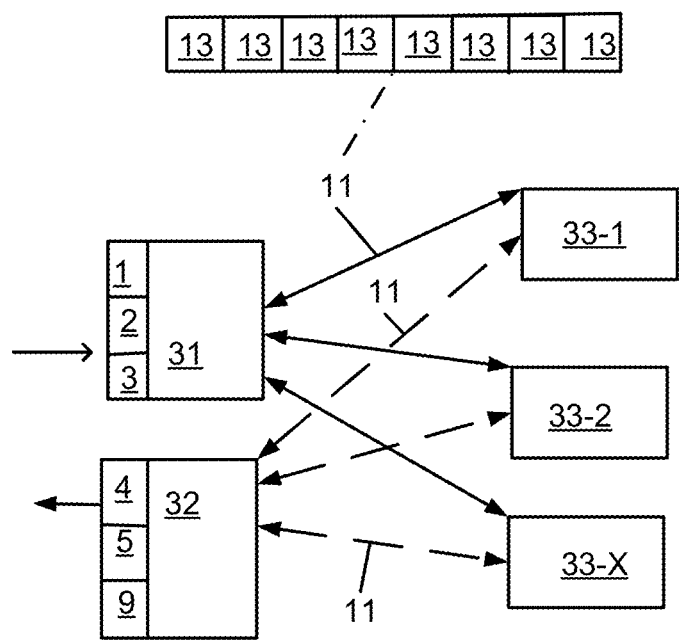
FIG. 5B illustrates an exemplary line module of the node in FIG. 5A in accordance with some examples of the disclosure.

FIG. 5B is a diagram of exemplary components of a line module 21. As shown in FIG. 5B, line module 21 may include a receiver (RX) photonic integrated circuit (PIC) 31, a transmitter (TX) PIC 32, and fabric managers (FMs) 33-1, 33-2, to 33-X (referred to collectively as "FMs 33," and individually as "FM 33") (where X>=1). While FIG. 5B shows a particular number and arrangement of components, line module 21 may include additional, fewer, different, or differently arranged components than those illustrated in FIG. 5B. Also, it may be possible for one of the components of line module 21 to perform a function that is described as being performed by another one of the components. It should be understood that the receiver 31 and transmitter 32 may include discrete components instead of PICs.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 5B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 5C:
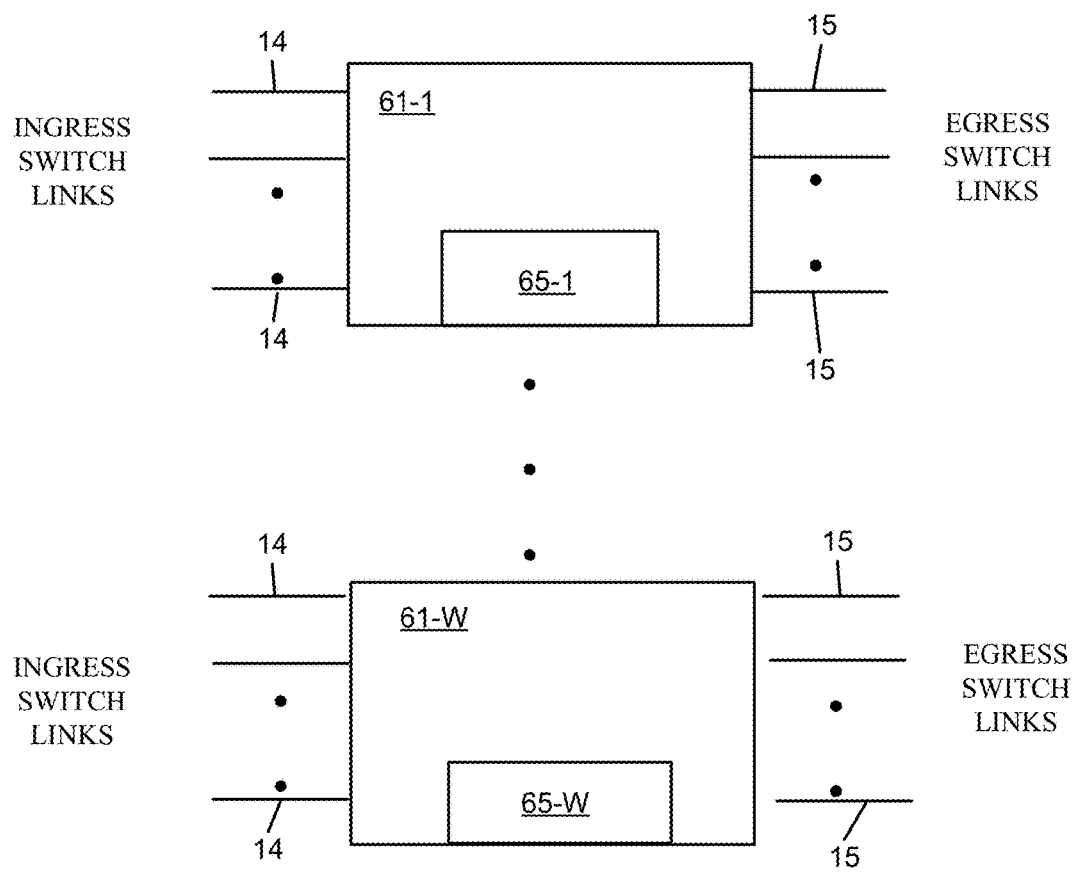
FIG. 5C illustrates an exemplary switch of the node in FIG. 5A in accordance with some examples of the disclosure.

FIG. 5C is a diagram of exemplary components of a switching plane 22. As shown in FIG. 5C, switching plane 22 may include switches 61-1, to 61-W (referred to collectively as "switches 61," and individually as "switch 61") (where W>=1). While FIG. 5C shows a particular number and arrangement of components, switching plane 22 may include additional, fewer, different, or differently arranged components than those illustrated in FIG. 5C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
|---|---|---|---|
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

Figure 5D:
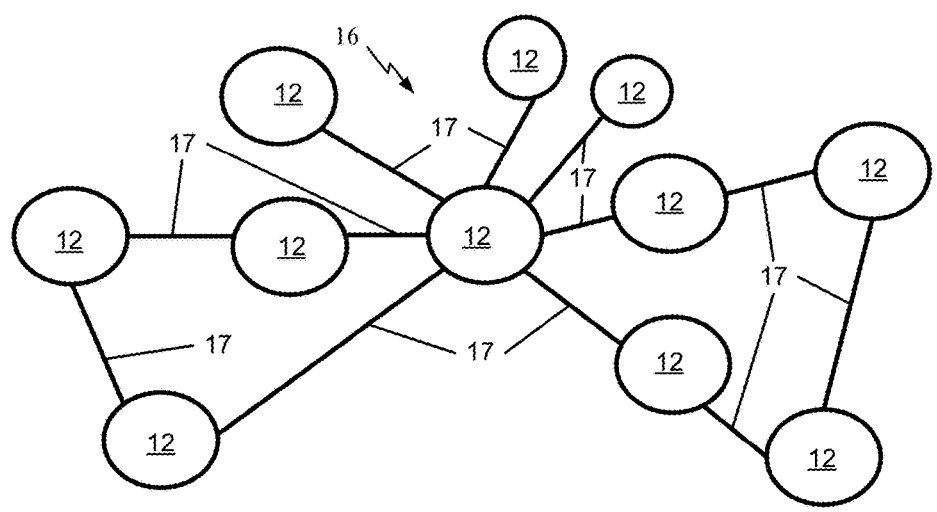
FIG. 5D illustrates an exemplary network configuration of the nodes in FIG. 5A in accordance with some examples of the disclosure.

FIG. 5D illustrates an exemplary network configuration of the nodes in FIG. 5A in accordance with some examples of the disclosure. As shown in FIG. 5D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a unidirectional or bi-direction medium such as an optical fiber capable of transporting an optical signal 6 or an electrical signal 11. The following examples describe apparatus and methods for use in conjunction with node 12.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. An apparatus comprising:
an interface configured to input a first packet that includes a first plurality of flow credit counts and output the first plurality of flow credit counts, each of the first plurality of flow credit counts indicates a data rate for a respective one of a plurality of data flows; and
a plurality of clock generators coupled to the interface, each of the plurality of clock generators configured to input a respective one of the first plurality of flow credit counts and output a clock signal that corresponds to the data rate of the respective one of the plurality of data flows,
wherein the interface inputs a new packet that includes a new plurality of flow credit counts during a time interval.

2. The apparatus of claim 1, wherein each of plurality of clock generators comprises a sigma delta modulator.

3. The apparatus of claim 1, wherein the time interval is at least 10 seconds.

4. The apparatus of claim 1, wherein each of plurality of clock generators is coupled to a system clock signal and each of a respective outputted clock signal is different than the system clock signal.

5. The apparatus of claim 1, wherein the apparatus is incorporated into one of a switch or a reconfigurable optical add drop multiplexer.

6. An apparatus comprising:
an interface configured to input a first packet that includes a first plurality of flow credit counts and output the first plurality of flow credit counts, each of the first plurality of flow credit counts indicates a data rate for a respective one of a plurality of data flows; and
a plurality of clock generators coupled to the interface, each of the plurality of clock generators configured to input a respective one of the first plurality of flow credit counts and output a clock signal that corresponds to the data rate of the respective one of the plurality of data flows,
wherein the interface is further configured to input a second packet that includes a second plurality of flow credit counts and output the second plurality of flow credit counts, each of the second plurality of flow credit counts indicates the data rate for the respective one of the plurality of data flows.

7. A method comprising:
receiving, at an interface, a first packet that includes a first plurality of flow credit counts, each of the first plurality of flow credit counts indicates a data rate for a respective one of a plurality of data flows; and
outputting, by the interface, each of the first plurality of flow credit counts to a respective one of a plurality of clock generators coupled to the interface, each of the plurality of clock generators configured to input a respective one of the first plurality of flow credit counts and output a clock signal that corresponds to the data rate of the respective one of the plurality of data flows,
wherein the interface receives a new packet that includes a new plurality of flow credit counts during a time interval.

8. The method of claim 7, wherein each of plurality of clock generators comprises a sigma delta modulator.

9. The method of claim 7, wherein the time interval is at least 10 seconds.

10. The method of claim 7, wherein each of plurality of clock generators is coupled to a system clock signal and each of a respective outputted clock signal is different than the system clock signal.

11. The method of claim 7, wherein the interface is incorporated into one of a switch or a reconfigurable optical add drop multiplexer.

12. A method comprising:
receiving, at an interface, a first packet that includes a first plurality of flow credit counts, each of the first plurality of flow credit counts indicates a data rate for a respective one of a plurality of data flows; and
outputting, by the interface, each of the first plurality of flow credit counts to a respective one of a plurality of clock generators coupled to the interface, each of the plurality of clock generators configured to input a respective one of the first plurality of flow credit counts and output a clock signal that corresponds to the data rate of the respective one of the plurality of data flows, the method further comprising receiving, at the interface, a second packet that includes a second plurality of flow credit counts, each of the second plurality of flow credit counts indicates the data rate for the respective one of the plurality of data flows; and outputting, by the interface, the second plurality of flow credit counts to the respective one of the plurality of clock generators.

* * * * *